(12) United States Patent
Takiyama

(10) Patent No.: US 8,613,078 B2
(45) Date of Patent: Dec. 17, 2013

(54) INFORMATION PROCESSING APPARATUS, CONTROL METHOD THEREFOR, AND PROGRAM

(75) Inventor: Yasuhiro Takiyama, Yokohama (JP)

(73) Assignee: Canon Kabushiki Kaisha (JP)

( * ) Notice: Subject to any disclaimer, the term of this patent is extended or adjusted under 35 U.S.C. 154(b) by 566 days.

(21) Appl. No.: 12/499,793

(22) Filed: Jul. 8, 2009

(65) Prior Publication Data

US 2010/0011439 A1    Jan. 14, 2010

(30) Foreign Application Priority Data

Jul. 9, 2008   (JP) .................................. 2008-179462

(51) Int. Cl.
  *G06F 12/00*    (2006.01)
  *G06F 9/44*     (2006.01)
  *G06K 9/00*     (2006.01)

(52) U.S. Cl.
   USPC ............... 726/19; 726/22; 717/101; 382/115

(58) Field of Classification Search
   USPC .......... 709/225, 229; 713/168–174, 182–186; 726/208, 8, 17–19
   See application file for complete search history.

(56) References Cited

U.S. PATENT DOCUMENTS

| 2006/0045315 A1* | 3/2006 | Saitoh et al. ................... 382/115 |
| 2006/0056664 A1 | 3/2006 | Iwasaki |
| 2006/0294492 A1* | 12/2006 | Sakai ............................ 717/101 |
| 2007/0014442 A1 | 1/2007 | Yu |
| 2007/0118897 A1* | 5/2007 | Munyon et al. ................. 726/22 |
| 2008/0130969 A1* | 6/2008 | Asano et al. ................... 382/128 |

FOREIGN PATENT DOCUMENTS

| JP | 10-207584 A | 8/1998 |
| JP | 2003141088 A | 5/2003 |
| JP | 2006114018 A | 4/2006 |
| JP | 2007-018346 A | 1/2007 |

OTHER PUBLICATIONS

Japanese Office Action issued in Japanese counterpart application No. JP2008-179462, dated Feb. 1, 2013.
Japanese Office Action corresponding to JP 2008-179462, mail date Apr. 30, 2013.

* cited by examiner

*Primary Examiner* — Ashokkumar Patel
*Assistant Examiner* — Evans Desrosiers
(74) *Attorney, Agent, or Firm* — Rossi, Kimms & McDowell LLP

(57) ABSTRACT

The present invention enables improvement in user convenience while reducing security degradation. To accomplish this, an information processing apparatus includes a display unit that displays an operation screen; an acceptance unit that accepts input from a user; a display control unit that controls display so as not to change the operation screen to a predetermined state when a predetermined time elapses without accepting input from the user by the acceptance unit; and an acquisition unit that acquires biological information of the user, wherein the display control unit does not change the operation screen to the predetermined state even if the predetermined time elapses without accepting input from the user by the acceptance unit if, within the predetermined time, the acquisition unit acquires biological information of the last user from whom input was accepted by the acceptance unit before the predetermined time started to be counted.

16 Claims, 12 Drawing Sheets

F I G. 13

| DIRECTORY INFORMATION |
|---|
| PROGRAM CODE CORRESPONDING TO STEPS OF FLOWCHART IN FIG. 5 |
| PROGRAM CODE CORRESPONDING TO STEPS OF FLOWCHART IN FIG. 6 |
| PROGRAM CODE CORRESPONDING TO STEPS OF FLOWCHART IN FIGS. 9A AND 9B |
| |

INFORMATION PROCESSING APPARATUS, CONTROL METHOD THEREFOR, AND PROGRAM

BACKGROUND OF THE INVENTION

1. Field of the Invention

The present invention relates to an information processing apparatus, control method therefor, and program.

2. Description of the Related Art

Conventionally, some image processing apparatuses, which are examples of information processing apparatuses, limit functions available to a user based on results of user authentication. Such image processing apparatuses have user IDs of authorized users registered in advance, for example, to limit users. When an image processing apparatus receives a user ID input by a user, the image processing apparatus permits the user to log in to the image processing apparatus only if the received user ID matches a pre-registered user ID. Once login is permitted, the image processing apparatus retains settings received from the user and continues to display a setting screen based on the retained settings until the user logs out. When the user logs out of the image processing apparatus, the image processing apparatus discards the retained settings. Subsequently, when the user logs in again, the image processing apparatus displays an initial screen. Regarding a logout method, the user is logged out of the image processing apparatus, for example, when there is a logout request from the user or when there is no response from the user for a predetermined time.

However, with the logout method described above, if the user forgets to issue a logout request or within a predetermined time before the user is logged out, other users who are not authorized can use the image processing apparatus. This degrades security. To deal with this problem, a technique is known which detects the presence of a user in front of the apparatus using an infrared sensor (Japanese Patent Laid-Open No. 10-207584). The technique detects the presence of a user in front of the apparatus using a body sensor, and when the human presence ceases to be detected, puts the apparatus into a power-saving mode called OFF mode or Suspend mode.

However, the conventional technique described above has a problem as follows. For example, if the user moves out of the body sensor's range once and returns soon, the user has to make settings anew. In this way, although the conventional method prevents security degradation, it decreases user convenience.

SUMMARY OF THE INVENTION

The present invention enables realization of improvement in user convenience while reducing security degradation.

One aspect of the present invention provides an information processing apparatus comprising: a display unit that displays an operation screen; an acceptance unit that accepts input from a user; a display control unit that controls display so as to change the operation screen to a predetermined state when a predetermined time elapses without accepting input from the user by the acceptance unit; and an acquisition unit that acquires biological information of the user, wherein the display control unit does not change the operation screen to the predetermined state even if the predetermined time elapses without accepting input from the user by the acceptance unit if, within the predetermined time, the acquisition unit acquires biological information of the last user from whom input was accepted by the acceptance unit before the predetermined time started to be counted.

Another aspect of the present invention provides a control method for an information processing apparatus comprising: displaying an operation screen on a display unit; accepting input from a user via an operation unit; controlling a display so as to change the operation screen to a predetermined state when a predetermined time elapses without accepting input from the user via the operation unit; and acquiring biological information of the user, wherein the controlling does not change the operation screen to the predetermined state even if the predetermined time elapses without accepting input from the user by the accepting if, within the predetermined time, the acquiring acquires biological information of the last user from whom input was accepted via the operation unit before the predetermined time started to be counted.

Still another aspect of the present invention provides a computer-readable storage medium storing a computer program that makes a computer perform the control method for an information processing apparatus.

Further features of the present invention will be apparent from the following description of exemplary embodiments with reference to the attached drawings.

BRIEF DESCRIPTION OF THE DRAWINGS

FIG. 13 is a diagram illustrating a memory map of a storage medium which stores various data processing programs readable by the image processing apparatus according to the present invention.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>

Figure 1:
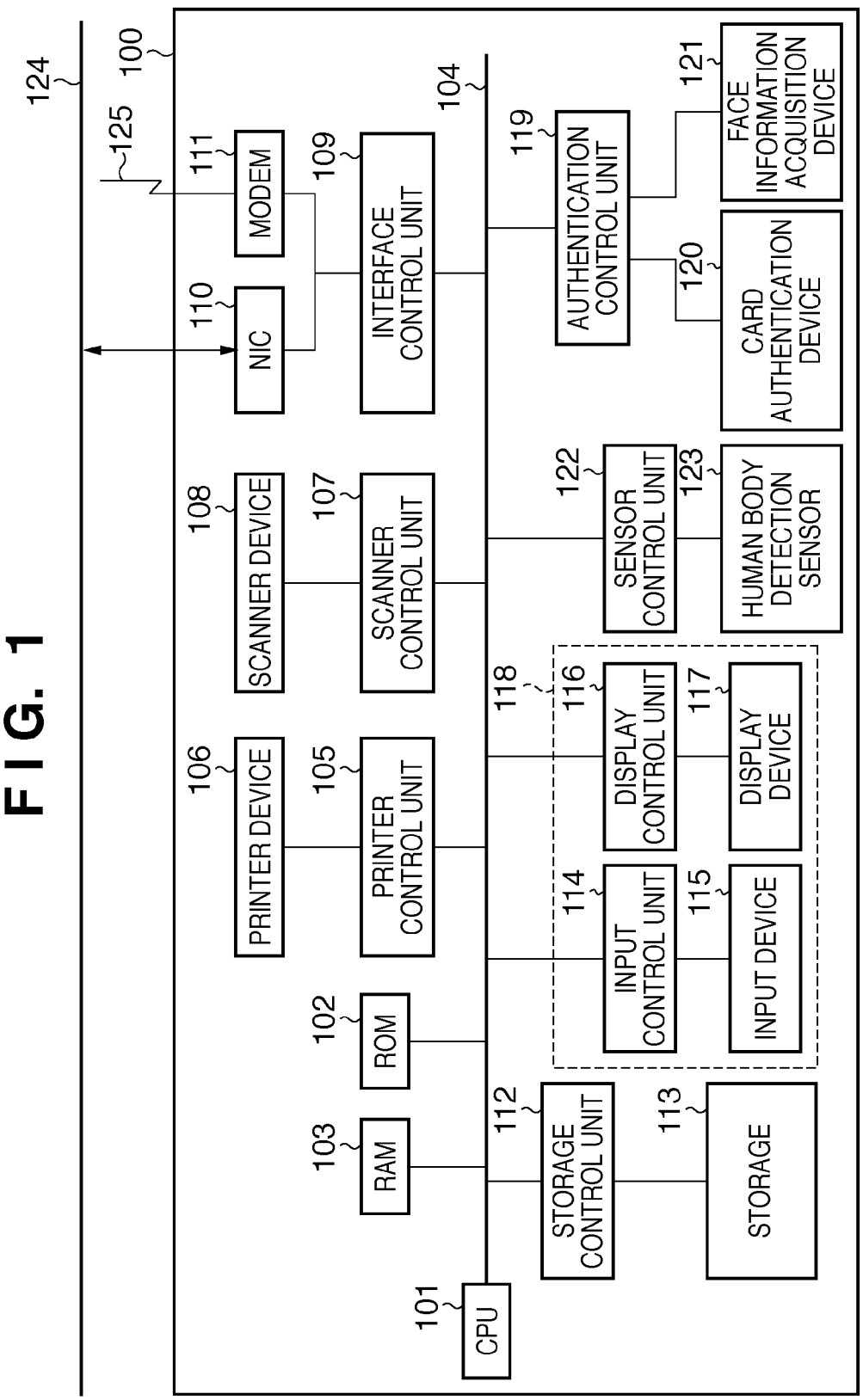
FIG. 1 is a block diagram showing a configuration of an image processing apparatus 100 according to a first embodiment.

A first embodiment will be described below with reference to FIGS. 1 to 8. FIG. 1 is a block diagram showing a configuration of an image processing apparatus 100 which is an example of an information processing apparatus according to the first embodiment. The image processing apparatus 100 described below includes component blocks mainly necessary in order to describe the present invention. However, the image processing apparatus according to the present invention is not limited to this configuration and may include other component blocks.

The image processing apparatus 100 includes a CPU 101, a ROM 102, a RAM 103, a data bus 104, a printer control unit 105, a printer device 106, a scanner control unit 107, and a scanner device 108. Also, the image processing apparatus 100 includes an interface control unit 109, a NIC 110, a modem 111, a storage control unit 112, a storage 113, an operation unit 118, an authentication control unit 119, a card authentication device 120, and a face information acquisition device 121. Furthermore, image processing apparatus 100 includes a sensor control unit 122 and a human body detection sensor 123.

The CPU 101, which stands for central processing unit, controls the entire image processing apparatus 100. The CPU 101 starts an OS (Operating System) using a boot program stored in a ROM 102. A controller program and various application programs stored on the large-capacity storage 113 run on the OS. The CPU 101 is connected with each of the component blocks via the data bus 104 which is an internal bus.

The RAM 103 operates as a temporary storage area which provides a main memory, work area, and the like for the CPU 101. Besides, the RAM 103 is also used as a temporary storage area for image processing.

The printer control unit 105 controls the printer device 106 to print an image on a supplied sheet based on image data. The printer device 106 prints the image on the sheet under the control of the printer control unit 105. The printer device 106 may be implemented as an electrophotographic, inkjet, or other similar type.

The scanner control unit 107 acquires image data by controlling the scanner device 108. The scanner device 108 includes an optical reader such as a CCD and converts image information on an original into electrical signal data.

The interface control unit 109 transmits and receives data such as image data to/from a network such as a LAN by controlling a network interface of the NIC (Network Interface Card) 110. Also, the interface control unit 109 transmits and receives data to/from a telephone line by controlling the modem 111.

The storage control unit 112 controls the storage 113. The storage 113 is a readable/writable storage device such as an HDD. The storage 113 stores a control program used to control the entire system and various application programs as well as data including scanned image data. Furthermore, the storage 113 is shared via a network 124 using the NIC 110 to allow another remote apparatus (not shown) to use stored image data.

The operation unit 118 includes an input control unit 114, an input device 115, a display control unit 116, and a display device 117 (also referred to as a display unit). The input control unit 114 is equipped with an input devices 115 such as a touch panel or hard keys and used by the user (operator) to enter user commands. The display control unit 116 displays an operation screen to the user by controlling the display device 117 such as an LCD or CRT.

The authentication control unit 119 controls the card authentication device 120 and the face information acquisition device 121 which acquires face information (face image data). The card authentication device 120 reads user information out of an ID card, converts the information into electrical signal data, and sends the electrical signal data to the CPU 101. According to the present embodiment, the ID card is equipped with a wireless communications unit and the card authentication device 120 transmits and receives data to/from the ID card wirelessly. Incidentally, the card authentication device 120 may be configured to accept an inserted ID card and transmit and receive data to/from the inserted ID card. The face information acquisition device 121, which includes a camera and the like, photographs the user's face, thereby acquires face information for use to identify an individual, and converts the face information into face image data. The resulting data is used for user authentication and the like.

The sensor control unit 122 controls the human body detection sensor 123. The human body detection sensor 123 detects a person in front of the image processing apparatus 100 using infrared rays or the like.

Figure 2:
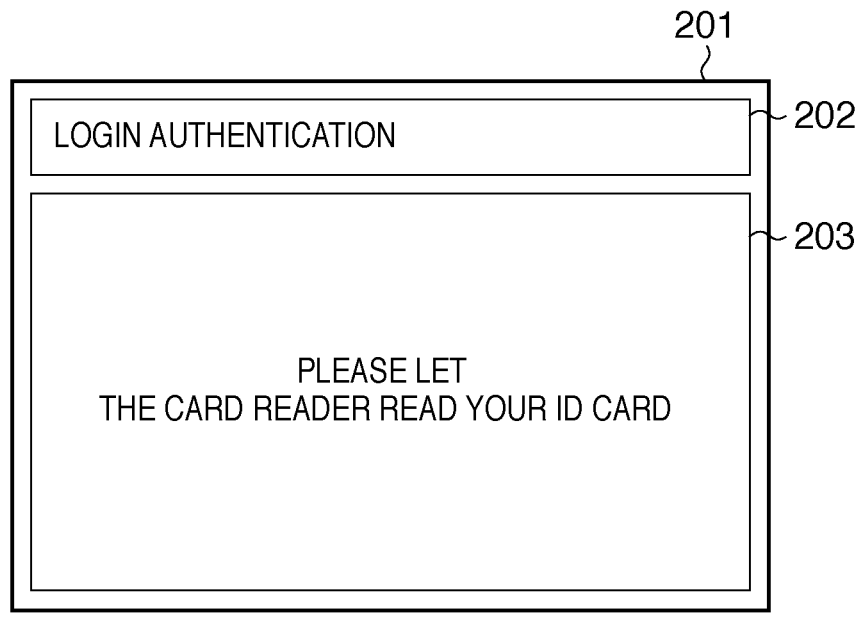
FIG. 2 is a diagram showing an example of an operation screen on the image processing apparatus 100 according to the first embodiment.
Figure 3:
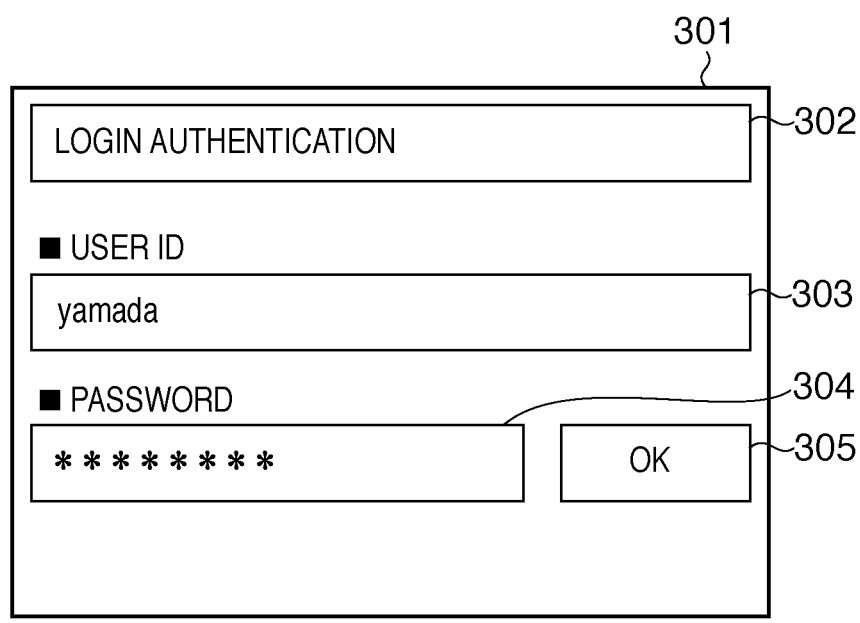
FIG. 3 is a diagram showing an example of an operation screen on the image processing apparatus 100 according to the first embodiment.

The operation screen when used for user authentication will be described with reference to FIGS. 2 and 3. FIGS. 2 and 3 are diagrams showing examples of the operation screen on the image processing apparatus 100 according to the first embodiment. The display control unit 116 performs display control based on instructions from the CPU 101. To use the image processing apparatus 100, the user logs in to the image processing apparatus 100 after going through an authentication process performed by the image processing apparatus 100 via the screen shown in FIG. 2 or 3. The screen shown in FIG. 2 or 3 is displayed by the display control unit 116 when the image processing apparatus 100 starts up, when a login request is received from the user, or when there is no user who has logged in the image processing apparatus 100.

The screen 201 shown in FIG. 2 is displayed as an authentication application stored in the ROM 102 is executed by the CPU 101. The screen 201 prompts the user to present an ID card, using fields 202 and 203. When an ID card is brought close to the display device 117 with the screen 201 in FIG. 2 displayed on the display device 117, the authentication control unit 119 reads a user ID and password from the ID card via the card authentication device 120. The authentication control unit 119 performs user authentication by comparing the presented user ID and password with a user ID and password prestored in the storage 113. When the user authentication is successful, the authentication control unit 119 permits the user to log in to the image processing apparatus 100.

The screen 301 in FIG. 3 is an input screen used for user login authentication. With the screen in FIG. 3 displayed, the user enters the user ID and password using a software keyboard 401 (see FIG. 4) of the operation unit 118. The display control unit 116 displays the user ID and password, entered by the user, in fields 303 and 304, respectively.

Figure 4:
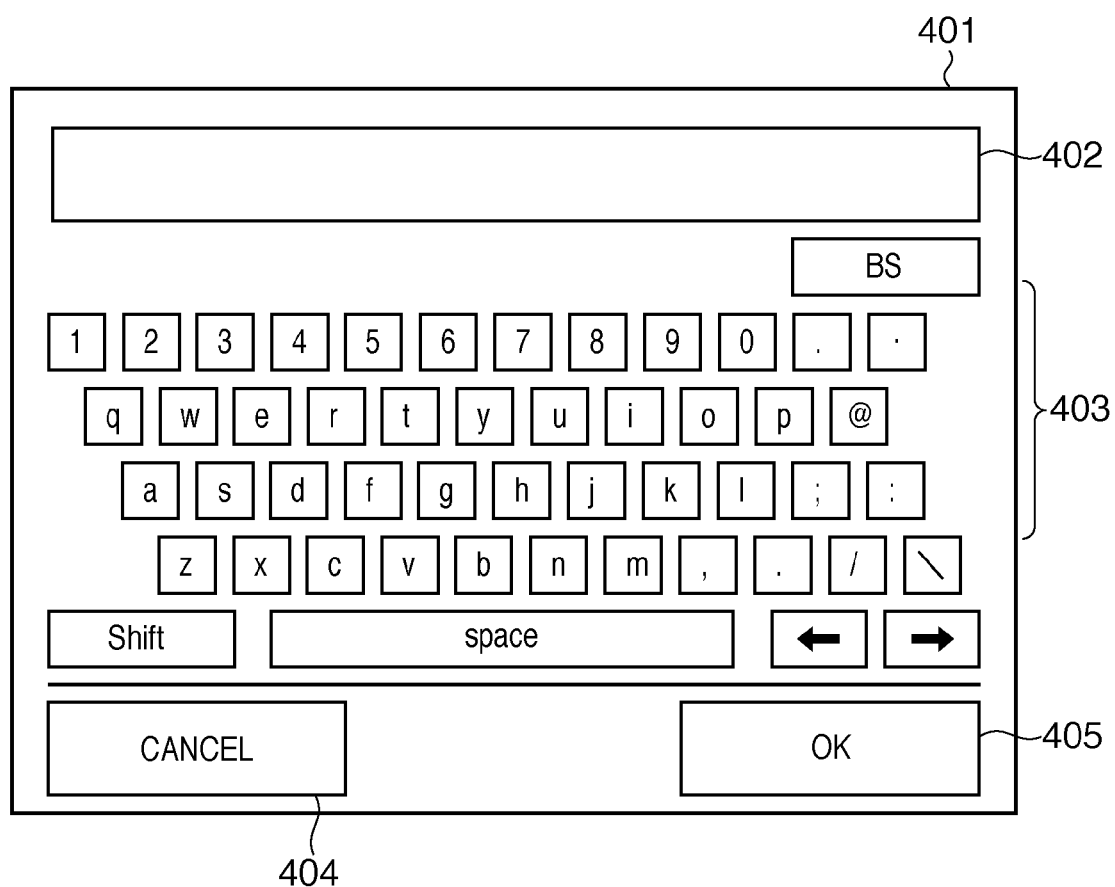
FIG. 4 is a diagram showing an example of a software keyboard 401 according to the first embodiment.

FIG. 4 is a diagram showing an example of the software keyboard 401. The software keyboard 401 is displayed by the display control unit 116 when the field 303 or 304 shown in FIG. 3 is pressed. The user enters the user's password using a key group 403 on the software keyboard 401. When the user enters the password, the display control unit 116 displays the same number of asterisks "*" as characters contained in the entered password, in an input string display label 402 above the software keyboard 401 to mask the entered characters. A cancel button 404 is used to cancel entries. An OK button 405 is used to confirm entries. Once the OK button 405 is pressed, the display control unit 116 stops displaying the software keyboard 401 and displays the screen shown in FIG. 3. In so doing, the display control unit 116 displays asterisks "*" in the field 304 of FIG. 3 instead of the password entered via the software keyboard 401.

As shown in FIG. 3, when the user presses an OK button 305 with the user ID and corresponding password entered, the authentication control unit 119 performs user authentication. When the user authentication is successful, the authentication control unit 119 permits the user to log in to the image processing apparatus 100. Also, the CPU 101 makes the display control unit 116 display a screen in order for the user to operate the image processing apparatus 100, permitting the user to use the image processing apparatus 100. That is, when the user authentication is successful, the CPU 101 keeps the user logged in to the image processing apparatus 100.

Figure 5:
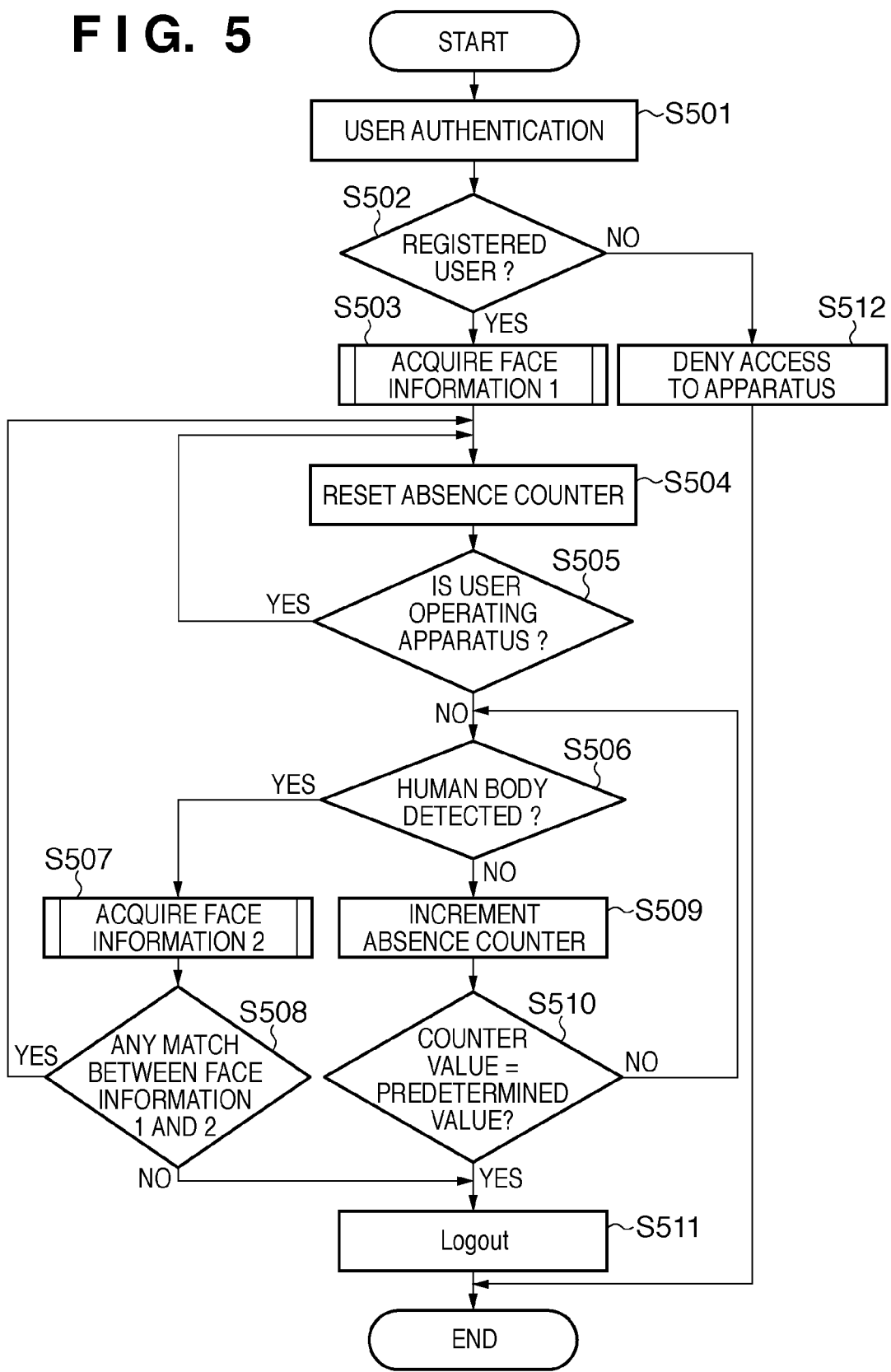
FIG. 5 is a flowchart showing procedures carried out by a CPU 101 according to the first embodiment.

Next, control performed by the CPU 101 according to the present embodiment will be described with reference to FIG. 5. FIG. 5 is a flowchart showing procedures carried out by the CPU 101. The process described below is performed as the CPU 101 executes a program stored in the ROM 102 by loading the program into the RAM 103.

In step S501, the CPU 101 performs user authentication using the authentication control unit 119, as described with reference to FIG. 2 or 3. If a user ID and password are acquired from an ID card in FIG. 2 or the OK button 305 is pressed in FIG. 3, the CPU 101 goes to S502.

In step S502, based on the user ID or password acquired in S501, the CPU 101 determines whether the user has already been registered. If the user has not been registered, the CPU 101 makes the display control unit 116 display a message such as "You are not registered" on the display device 117 and terminates processing. On the other hand, if the user has been registered, the CPU 101 makes the face information acquisition device 121 acquire face information 1 of the user and extracts feature point data of the face in step S503. Incidentally, the CPU 101 may perform user authentication in step S501 using the face information acquisition device 121. In that case, the CPU 101 determines whether user's face information obtained by photography using the face information acquisition device 121 has been registered in the storage 113. If it is determined that face information of the user has been registered in the storage 113, the CPU 101 permits the user to log in. If user authentication is performed using face information of the user in this way, step S503 may be skipped because there is no need to acquire face information of the user anew in S503. Details of S503 will be described later with reference to FIG. 6.

Next, in step S504, the CPU 101 resets (initializes) an absence counter (to zero). The absence counter counts the period during which the user is not present in front of the apparatus or no input from the operation unit 118 is detected. In step S505, the CPU 101 determines whether the user is operating the apparatus. If the user is operating the apparatus, the CPU 101 returns to step S504. On the other hand, if the user is not operating the apparatus, the CPU 101 goes to step S506. The determination as to whether the user is operating the apparatus is made, for example, by determining whether user input from the input device 115 is detected by the input control unit 114.

Next, in step S506, the CPU 101 determines whether there is input from the human body detection sensor 123 using the sensor control unit 122 and thereby determines whether a user is present in front of the image processing apparatus 100. To detect human body, the authentication control unit 119 may be made to determine whether a person is shown in an image based on photographic data obtained from the face information acquisition device 121. If the presence of a user is detected, the CPU 101 goes to step S507. If no human presence is detected, the CPU 101 goes to step S509. When the presence of a user is detected, the CPU 101 acquires face information 2 and extracts feature point data of the face using the face information acquisition device 121 in step S507.

Next, in step S508, the CPU 101 compares feature point data between face information 1 acquired in step S503 and face information 2 acquired in step S507. The comparison is made using the feature point data from face information 1 and 2 stored in the RAM 103. If the results of comparison satisfy a predetermined condition and it is determined that the two sets of feature point data are similar, the CPU 101 determines that the user who is in front of the apparatus is identical with the currently-logged user, and returns to step S504. On the other hand, if the results of comparison do not satisfy the predetermined condition, the CPU 101 determines that the user who is in front of the apparatus is not identical with the currently-logged user, and performs a logout process in step S511. In performing the logout process, the CPU 101 discards setting information received from the user and retained in the RAM 103 and storage 113 and frees memory areas in the RAM 103 and storage 113. When the same user logs in to the image processing apparatus 100 next time, the CPU 101 displays the initial screen on the operation unit 118. Instead of the initial screen, the image processing apparatus 100 may display a screen specified by the user in advance. The predetermined condition described above can be set arbitrarily. For example, a perfect match in position data may be used as the condition. However, depending on accuracy of devices and the like, for example, a match of 70% or more among all position data may be used as the condition.

If it is determined in step S506 that there is no user in front of the image processing apparatus 100, the CPU 101 increments the absence counter in step S509. Next, in step S510, the CPU 101 determines whether the value of the absence counter is equal to a predetermined value. If it is determined that the values are equal, the CPU 101 determines that the user has been absent in front of the image processing apparatus 100 for a predetermined time, and the CPU 101 goes to step S511 to perform a logout process. On the other hand, if it is determined that the values are not equal, the CPU 101 returns to step S505 to repeat steps S505 to S510. As long as no user input is received and no user presence is detected by the human body detection sensor 123, the CPU 101 repeats incrementing the absence counter.

The above-described predetermined value of the absence counter may be changeable by the user via the operation unit 118. The smaller the value, the sooner the user will be logged out of the image processing apparatus 100 when absent. Although not shown in the flowchart, when the user presses a logout button on the operation unit 118, the CPU 101 logs the user out of the image processing apparatus 100.

Figure 6:
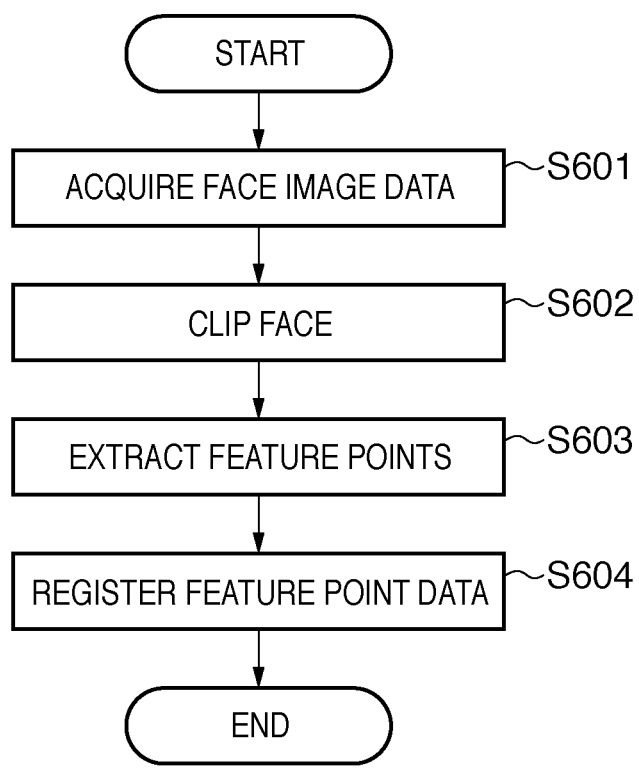
FIG. 6 is a flowchart showing procedures for acquiring face information according to the first embodiment.

Next, a face information acquisition process will be described with reference to FIG. 6. FIG. 6 is a flowchart showing procedures for acquiring face information according to the first embodiment. The process described below is performed by the authentication control unit 119 under the control of the CPU 101 as the CPU 101 executes a program stored in the ROM 102.

Figure 7:
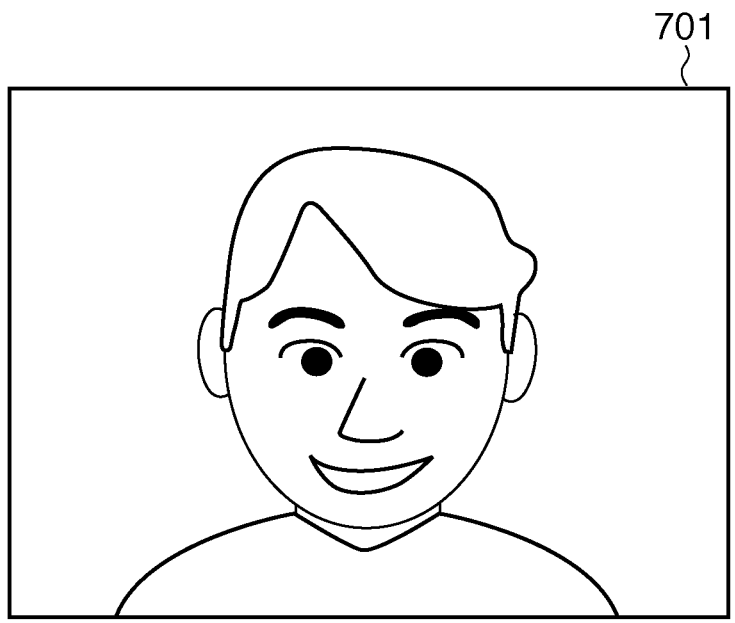
FIG. 7 is a diagram showing an example of face image data.

In step S601, the authentication control unit 119 makes the face information acquisition device 121 acquire face image data by photographing the face of the user. Face image data is shown, for example, in FIG. 7. FIG. 7 is a diagram showing an example of face image data 701. The authentication control unit 119 performs the following process based on the face image data 701.

First, in step S602, the authentication control unit 119 clips part which corresponds to the face from the face image data

Figure 8:
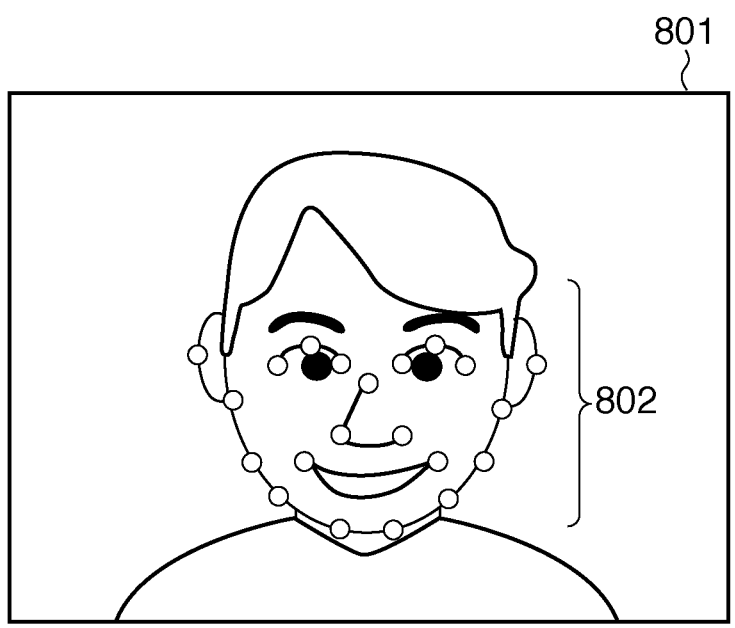
FIG. 8 is a diagram showing feature points in face image data 801.

701. Next, in step S603, the authentication control unit 119 extracts feature points of the face. The feature points of the face are multiple items of position data (white dots) which represent facial parts and contours 802 of face image data 801 in FIG. 8. FIG. 8 is a diagram showing feature points in the face image data 801.

Once feature points are extracted, the authentication control unit 119 stores position data which represents the extracted feature points in the storage 113 via the storage control unit 112 in step S604. This allows the CPU 101 to compare position data between the face information 1 and face information 2 in step S508 (described above) and thereby determine whether the predetermined condition is satisfied, based on similarity between the two sets of face information.

As described above, if no input is received from a currently-logged user until a predetermined time elapses, the image processing apparatus 100 according to the present embodiment performs a logout process for the user. Furthermore, if a human body is detected by the human body detection sensor 123 within the predetermined time counted by the absence counter, the image processing apparatus 100 determines whether the detected person is the currently-logged user. If the detected person is not the currently-logged user, the image processing apparatus 100 performs a logout process for the currently-logged user. In this way, the image processing apparatus 100 prevents other users from using the image processing apparatus 100 during the predetermined time left before the logout process. That is, the image processing apparatus 100, which performs logout control by detecting a change in the user who is using the apparatus, can prevent unauthorized users from using the image processing apparatus. Also, if the presence of the currently-logged user is confirmed again before the expiration of the predetermined time counted from the time when input stopped, the image processing apparatus 100 initializes the absence counter and continues to permit the user to use the image processing apparatus 100. Consequently, when the currently-logged user leaves the apparatus once and returns again (moves out of the range of the human body detection sensor 123 and returns again), the user can use the image processing apparatus 100 without logging in again. The image processing apparatus 100 configured in this way is useful in a situation described below. For example, there may be cases where user A wants to read a manual of the image processing apparatus 100 while using the image processing apparatus 100. In such a case, it is conceivable that user A leaves the image processing apparatus 100 to get the manual and then returns to the image processing apparatus 100.

Suppose that user A leaves the image processing apparatus 100 after operating the image processing apparatus 100 via the operation unit 118 the last time before the predetermined time starts to be counted and that the absence counter reaches the predetermined value while the image processing apparatus 100 is left unattended. In that case, user A is logged out of the image processing apparatus 100 automatically. This prevents another user B from using the image processing apparatus 100 using privileges of user A when user A is unable to return for a long period of time. For example, it is possible to prevent user B from using functions or referring to address book information which cannot be done without the privileges of user A.

On the other hand, after leaving the image processing apparatus 100, if user A returns before the absence counter reaches the predetermined value, user A is not logged out of the image processing apparatus 100 even if no input is received from user A. Consequently, user A can continue operating the image processing apparatus 100 if wants to, without logging in again.

Suppose that user A leaves the image processing apparatus 100 and that another user B approaches the image processing apparatus 100 to use the image processing apparatus 100 before user A returns. In that case, the image processing apparatus 100 photographs the face of user B and detects that the face is different from that of user A currently logged in to the image processing apparatus 100. Consequently, the image processing apparatus 100 logs user A out of the image processing apparatus 100. Therefore, the image processing apparatus 100 can prevent user B from using functions or referring to address book which cannot be done without the privileges of user A when user B uses the image processing apparatus 100 while user A logs in to the image processing apparatus 100.

Thus, the image processing apparatus 100 can enable improvement in user convenience while reducing security degradation.

Note that the present invention is not limited to the above embodiment and that various modifications are possible. For example, the image processing apparatus 100 may extract multiple items of position data which represent feature points from face image data. In that case, when comparing two sets of face image data, the image processing apparatus checks two sets of position data against each other and thereby determines whether a predetermined condition is satisfied. In this way by extracting multiple feature points from face image data, it is possible to facilitate comparison and thereby reduce processing loads.

<Second Embodiment>

Next, a second embodiment will be described below with reference to FIGS. 9 to 11. In the first embodiment described above, the image processing apparatus 100 uses face information to log out the user. The present embodiment relates to a method for improving user convenience when the user is logged out automatically while making settings on the image processing apparatus 100.

Configuration of the image processing apparatus according to the present embodiment is the same as the first embodiment shown in FIG. 1, and thus description thereof will be omitted here. Similarly description of the operation screens in FIGS. 2 and 3 will also be omitted here.

Figure 9A:
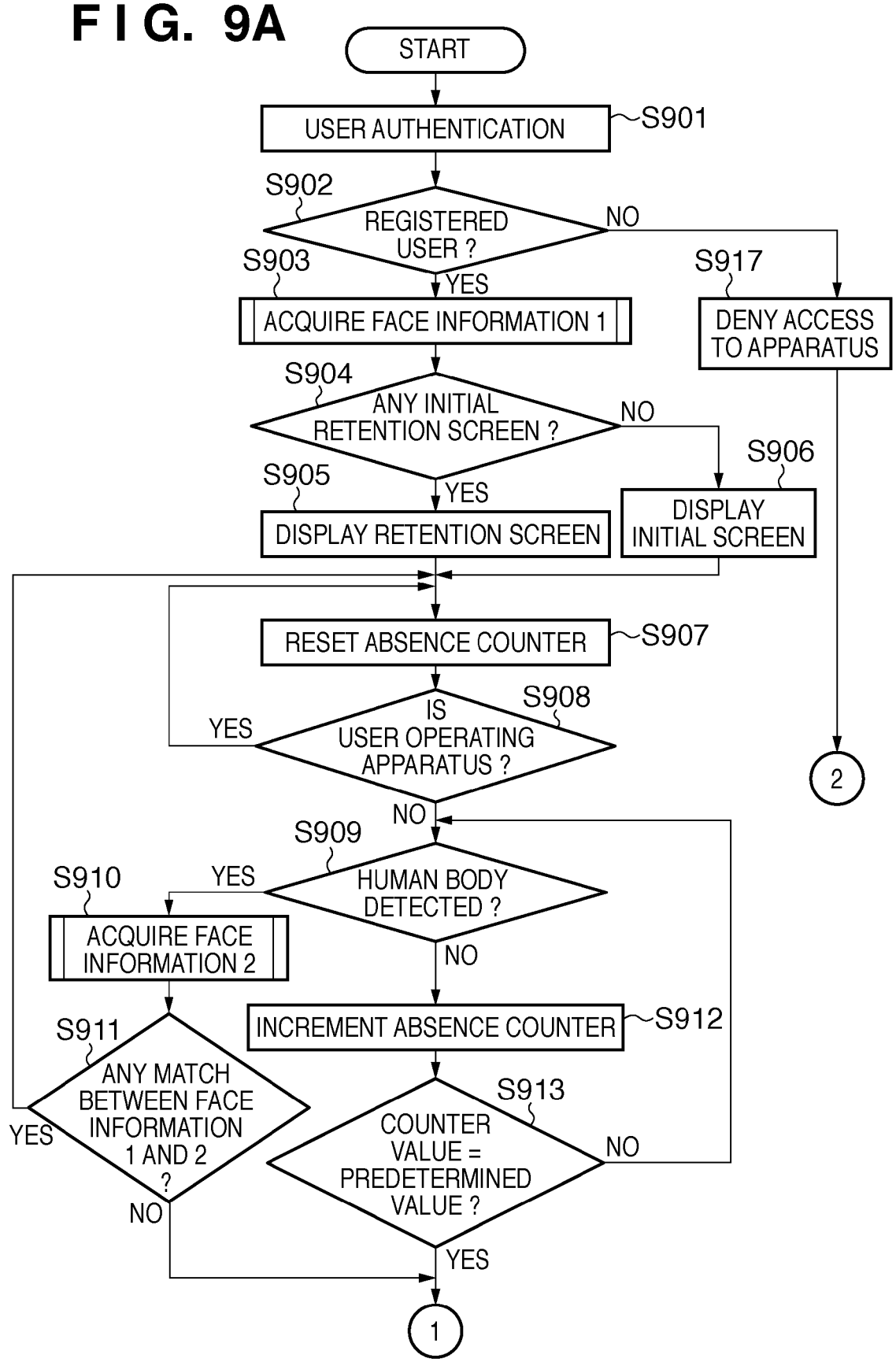
FIGS. 9A and 9B are flowcharts showing procedures carried out by a CPU 101 according to a second embodiment.
Figure 9B:
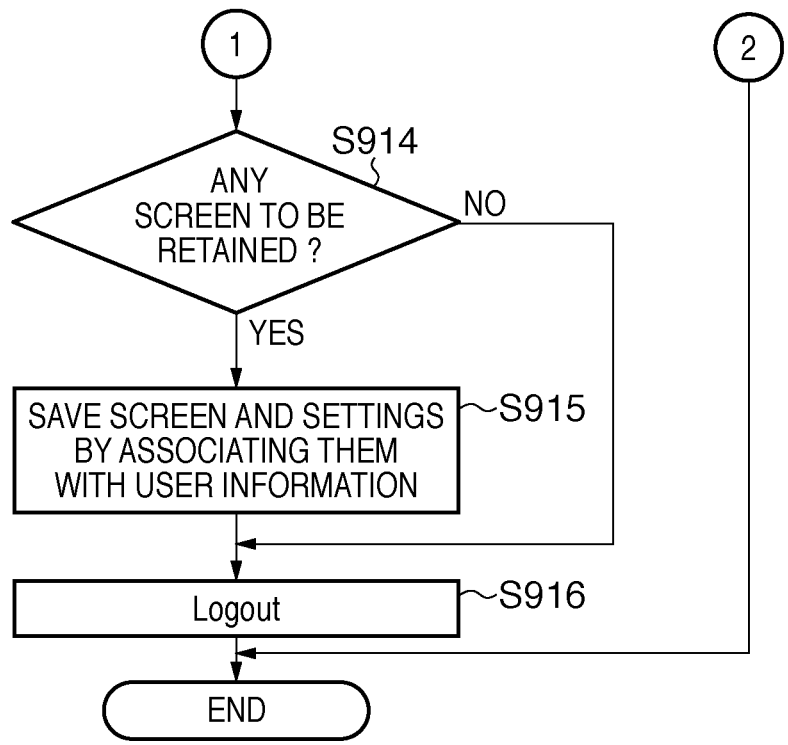
Figure 10:
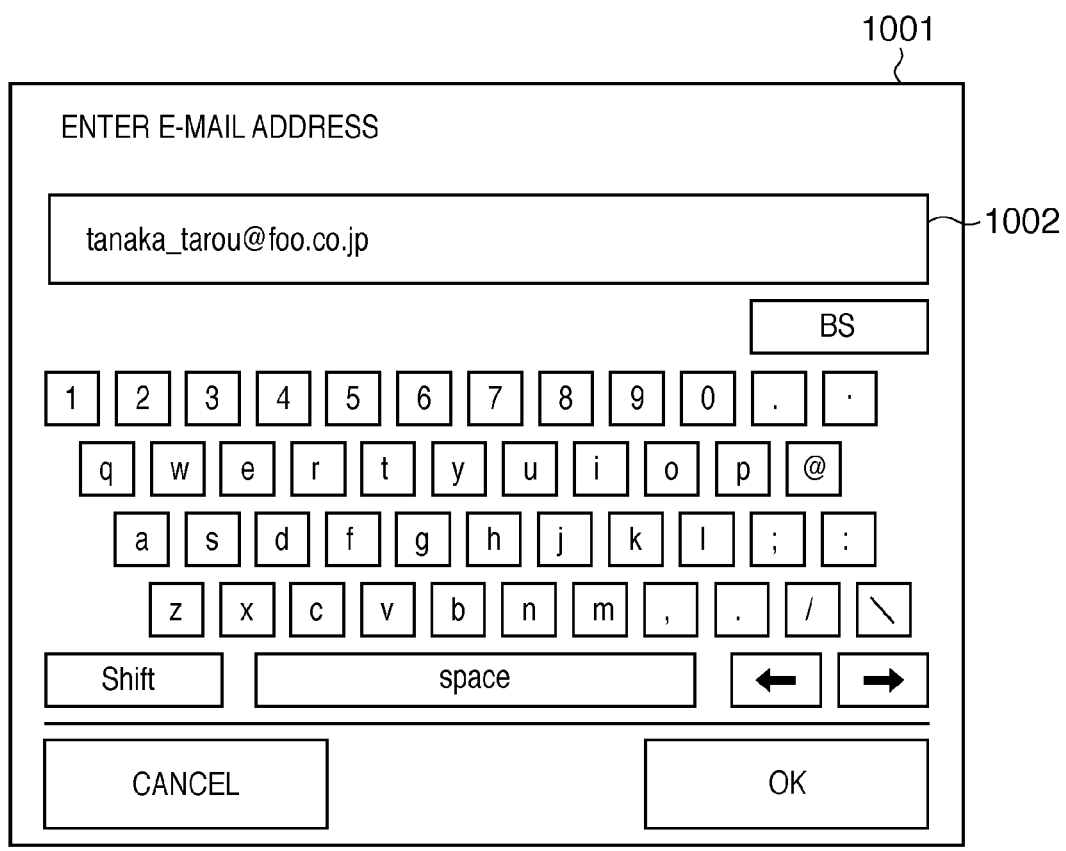
FIG. 10 is a diagram showing an example of a retention screen 1001 according to the second embodiment.

FIGS. 9A and 9B are flowcharts showing procedures carried out by a CPU 101 according to the second embodiment. The process described below is controlled integrally as the CPU 101 executes a program stored in the ROM 102 by loading the program into the RAM 103.

In step S901, the CPU 101 makes the authentication control unit 119 perform user authentication as described with reference to FIGS. 2 and 3. If a user ID and password are acquired from an ID card in FIG. 2 or the OK button 305 is pressed in FIG. 3, the CPU 101 goes to S902.

In step S902, based on the user ID or password acquired in S901, the CPU 101 determines whether the user has already been registered. If the user has not been registered, the CPU 101 makes the display control unit 116 display a message such as "You are not registered" on the display device 117 and terminates processing. On the other hand, if the user has been registered, the CPU 101 acquires face information 1 of the user and extracts feature point data of the face in step S903. Incidentally, the CPU 101 may perform user authentication in step S901 using the face information acquisition device 121. In that case, the CPU 101 determines whether a user's face information obtained by photography using the face information acquisition device 121 has been registered in the storage 113. If it is determined that face information of the user has been registered in the storage 113, the CPU 101 permits the user to log in. If user authentication is performed using face information of the user in this way, step S903 may be skipped because there is no need to acquire face information of the user anew in S903. Details of S903 are the same as in the first embodiment, and thus description thereof will be omitted here.

Next, in step S904, the CPU 101 determines whether there is a retention screen from the previous login of the same user. The retention screen retains user settings, being stored in the storage 113 by the CPU 101 in step S915 (described later). If a retention screen is being retained, the CPU 101 displays it on the display device 117 in step S905. FIG. 10 is a diagram showing an example of a retention screen 1001. FIG. 10 shows a screen on which the user is in the process of entering an e-mail address. However, the retention screen is not limited to this example, and may be a copy settings screen which contains settings, such as the number of copies and image density, specified by the user. On the other hand, if no retention screen 1001 is being retained, the CPU 101 displays an initial screen in step S906.

Next, in step S907, the CPU 101 resets (initializes) the absence counter (to zero). The absence counter counts the period during which the user is not present in front of the apparatus or no input is detected. In step S908, the CPU 101 determines whether the user is operating the apparatus. If the user is operating the apparatus, the CPU 101 goes to step S907. On the other hand, if the user is not operating the apparatus, the CPU 101 goes to step S909. The determination as to whether the user is operating the apparatus is made, for example, by determining whether user input from the input device 115 is detected by the input control unit 114.

Next, in step S909, the CPU 101 determines whether there is input from the human body detection sensor 123 using the sensor control unit 122 and thereby detects whether a user is present in front of the image processing apparatus 100. The method for human body detection is the same as in the first embodiment, and thus description thereof will be omitted here. If the presence of a user is detected, the CPU 101 goes to step S910. If no human presence is detected, the CPU 101 goes to step S912. When the presence of a user is detected, the CPU 101 acquires face information 2 and extracts feature point data of the face using the face information acquisition device 121 in step S910.

Next, in step S911, the CPU 101 compares feature point data between the face information 1 acquired in step S903 and face information 2 acquired in step S910. The comparison is made using the feature point data from face information 1 and 2 stored in the RAM 103. If the results of comparison satisfy a predetermined condition and it is determined that the two sets of feature point data are similar, the CPU 101 determines that the user who is in front of the apparatus is identical with the currently-logged user, and returns to step S907. On the other hand, if the results of comparison do not satisfy the predetermined condition, the CPU 101 determines that the user who is in front of the apparatus is not identical with the currently-logged user, and goes to step S914. The predetermined condition described above can be set arbitrarily. For example, a perfect match in position data may be used as the condition. However, depending on accuracy of devices and the like, for example, a match of 70% or more among all position data may be used as the condition.

If it is determined in step S909 that there is no user in front of the image processing apparatus 100, the CPU 101 increments the absence counter in step S912. Next, in step S913, the CPU 101 determines whether the value of the absence counter is equal to a predetermined value. If it is determined that the values are equal, the CPU 101 determines that the user has been absent in front of the image processing apparatus 100 for a predetermined time and goes to step S914. On the other hand, if it is determined that the values are not equal, the CPU 101 returns to step S908 to repeat steps S908 to S913.

If the user has been changed or if there is no input for a predetermined time, the CPU 101 performs a logout process in steps S914 to S916. In step S914, the CPU 101 determines whether to retain the screen operated by the current user. If there is no screen to be retained, the CPU 101 goes directly to S916 to perform a logout process. On the other hand, if there is a screen to be retained, the CPU 101 saves the current screen and settings in the storage 113 in step S915 by associating them with identification information (user ID) uniquely assigned to each user.

The determination as to whether there is a screen to be retained is made based on the type of screen the user is operating. For example, if predetermined settings are made on a screen when compared with an initial settings screen, the CPU 101 determines that the screen is to be retained. For example, the retention screen 1001 shown in FIG. 10 is an input screen on which the user is in the process of entering an e-mail address. A field 1002 contains an e-mail address to which the user is going to send an e-mail. According to the present embodiment, when a logout process is performed in this state, the screen and settings are saved in step S915 before the logout process in step S916.

Next, user-specific information according to the present embodiment will be described with reference to FIG. 11. FIG. 11 is a diagram showing registration information 1101 unique to a user. The registration information 1101 is managed by being stored in the RAM 103 or storage 113 of the image processing apparatus 100.

Figure 11:
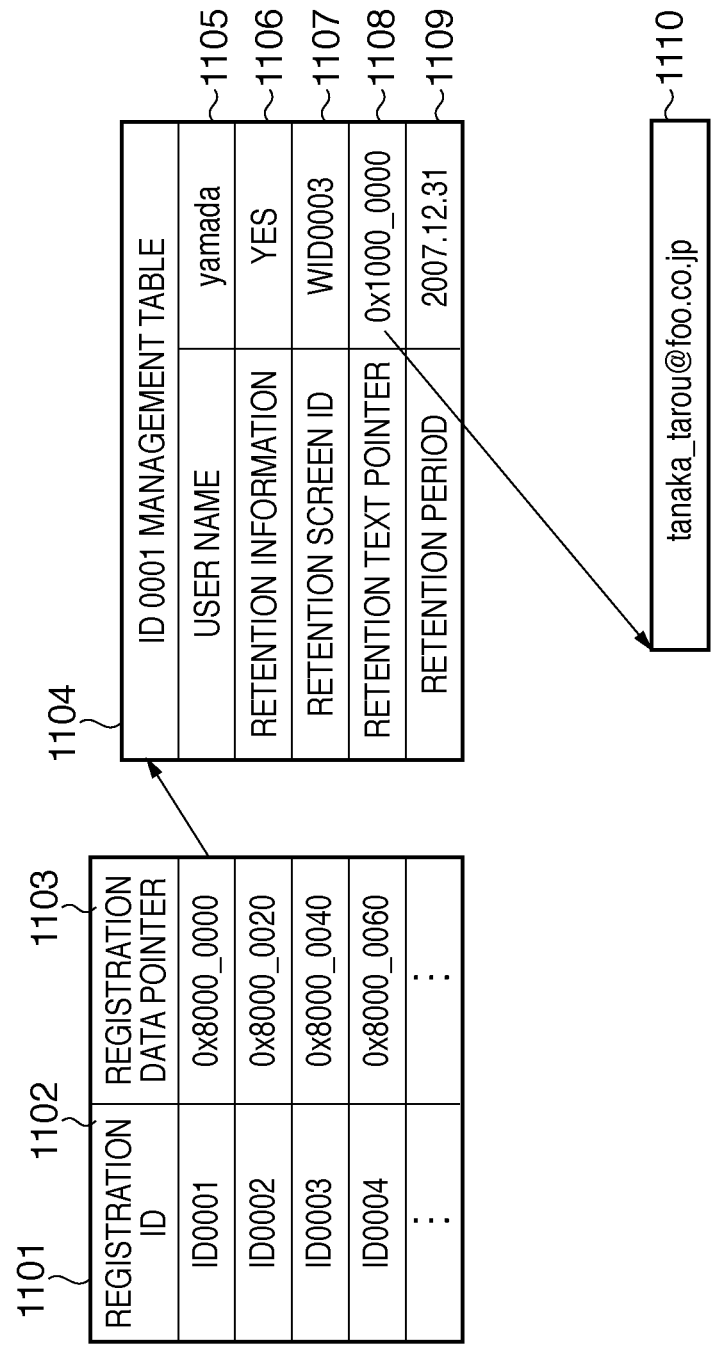
FIG. 11 is a diagram showing registration information 1101 unique to a user, according to the second embodiment.

As shown in FIG. 11, the registration information 1101 includes a registration ID 1102 and registration data pointer 1103. The registration data pointer 1103 contains a pointer to a management table 1104 which manages data corresponding to the registration ID 1102.

The management table 1104 contains User Name 1105, Retention Information 1106, Retention Screen ID 1107, Retention Text Pointer 1108, and Retention Period 1109. User Name 1105 contains a character string which represents the user such as "yamada." Retention Information 1106 contains a retention information flag which indicates whether or not a retention screen (such as described above) is retained. Retention Screen ID 1107 contains a screen ID of the retained screen. Retention Text Pointer 1108 contains a pointer to a text inputted in the retention screen. Retention Period 1109 contains a retention period of the screen to be retained. Reference numeral 1110 in FIG. 11 denotes content of text data.

The next time the same user logs in, the image processing apparatus 100 according to the present embodiment determines in step S904 whether there is a retention screen, based on the registration information 1101, and displays a retention screen if there is one.

As described above, the image processing apparatus 100 according to the present embodiment provides the same advantage as the first embodiment. In addition, according to the second embodiment, even if the user is logged out automatically, the image processing apparatus 100 saves the current screen (the screen before the change to the initial screen as a result of the automatic logout) and settings and restores the screen at next login. This enables improvement in user convenience while reducing security degradation.

<Third Embodiment>

Figure 12:
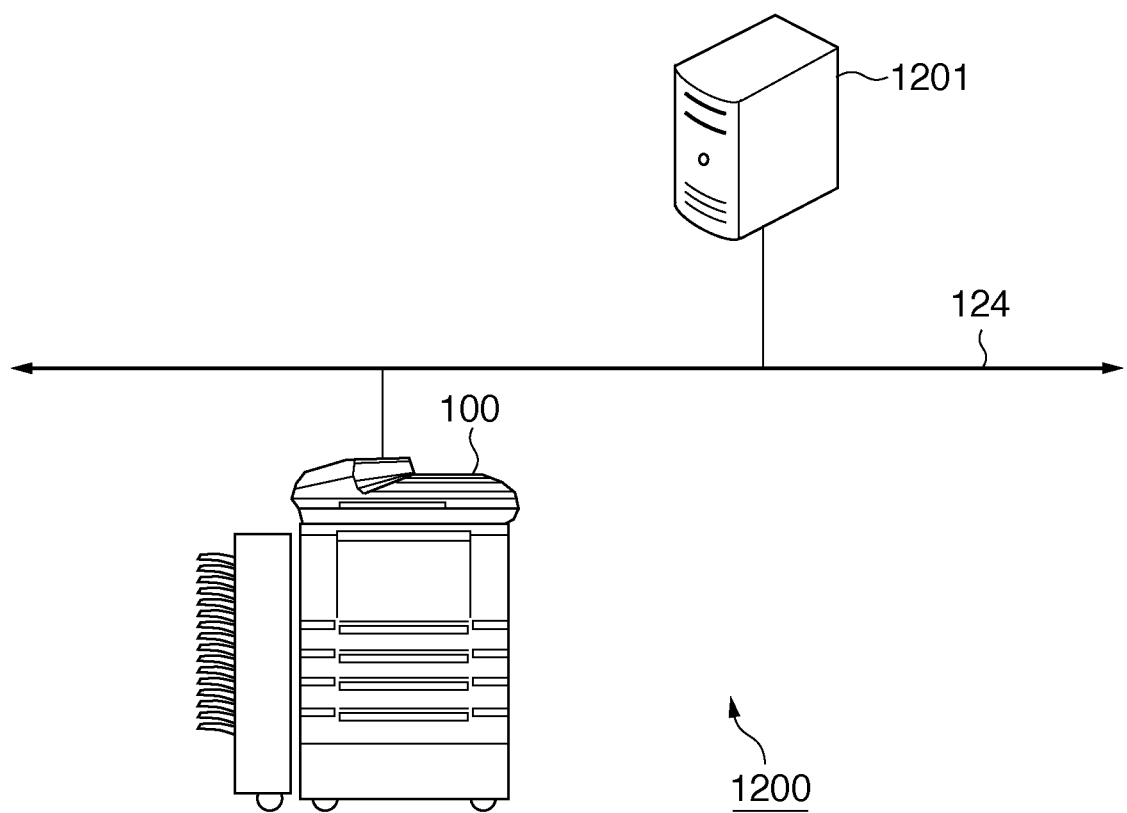
FIG. 12 is a diagram showing a configuration of an image processing system 1200 according to a third embodiment.

Next, a third embodiment will be described with reference to FIG. 12. FIG. 12 is a diagram showing a configuration of an image processing system 1200 according to the third embodiment. The image processing system 1200 includes an image processing apparatus 100 and authentication server 1201, which are interconnected via a network 124 in such a way as to be able to communicate with each other.

In the first and second embodiments, the authentication control unit 119 extracts feature points from the face image data acquired by the face information acquisition device 121. However, according to the present embodiment, upon extracting feature points from face image data, the image processing apparatus 100 transmits the extracted feature points to the authentication server 1201. The authentication server 1201 compares the received feature points with the registration data of feature points stored in the memory of the authentication server 1201 and thereby determines whether a predetermined condition is satisfied. In step S508 in FIG. 5, instead of making a determination as described above, the CPU 101 of the image processing apparatus 100 according to the present embodiment receives a result of the determination as to whether the predetermined condition is satisfied from the authentication server 1201.

Thus, the image processing system 1200 according to the present embodiment may perform the user authentication in step S501 in FIG. 5 and step S901 in FIG. 9A using the authentication server 1201. Consequently, processes related to face authentication can be distributed to multiple apparatuses, making it possible to reduce processing loads of the image processing apparatus 100. All that is required is that the authentication server 1201 have the configuration needed to compare face information as is done by the authentication control unit 119 in the first and second embodiments, and face authentication can be performed even if individual image processing apparatus 100 connected to the network 124 do not have such a configuration. Even when face authentication is performed by the authentication server 1201, the advantages of the first and second embodiments are not reduced.

According to the first embodiment, the user's face information authenticated in S501 and S502 is acquired in S503 and compared with the face information acquired by photography in S507 to determine whether a different user is using the image processing apparatus 100. However, if the image processing apparatus 100 stores face information, for example, in tabular format by associating the face information of each user with the user ID, the determination may be made as follows. For example, the CPU 101 of the image processing apparatus 100 stores the user ID acquired in S501 in a memory such as the storage 113. Then, the CPU 101 finds the user ID corresponding to the face information acquired in S507 out of the table and determines whether the user ID corresponding to the face information is identical with the user ID acquired in S501. If it is determined that the user IDs are identical, the CPU 101 goes to S504. Otherwise, the CPU 101 goes to S511. This makes it possible to determine the identity of the user who is operating the image processing apparatus 100 even if face information is not necessarily acquired in S503. Compared with such a method, the first embodiment, which acquires face information in S503, can determine whether the operating user is the same person even though users' face information and user IDs are not associated with each other in advance. Although a variation of the first embodiment has been described here, the same method is also applicable to the second embodiment.

In the above embodiments, face information obtained by photography is used as biological information, but this is not restrictive. For example, fingerprint information, vein information, voiceprint information, hand geometry information, retina information, iris information, or a combination thereof may be acquired from the user. Regarding an acquisition method, a biometric sensor appropriate to the type of information can be used.

In the case of the first embodiment, for example, to acquire fingerprint information as biological information of the user, a fingerprint reader unit can be attached to the image processing apparatus 100. Then, the CPU 101 performs much the same process as in the flowchart in FIG. 5. When the presence of a user is detected by the human body detection sensor 123 in S506, the image processing apparatus 100 goes to S507 to acquire a fingerprint of the user using the fingerprint reader unit. When a fingerprint of the user is acquired properly with a finger of the user placed on the fingerprint reader unit, the CPU 101 determines in S508 whether the fingerprint matches the user's fingerprint information acquired in S503. If it is determined that there is a match, the CPU 101 goes to S504 to reset the absence counter. That is, the CPU 101 extends the time left before the user is logged out of the information processing apparatus 100. On the other hand, if it is determined in S508 that there is no match, the CPU 101 goes to S511 to log out the logged user who has been authenticated in S501. This allows the user to extend the time left before automatic logout by simply making the fingerprint reader unit read fingerprint information. Also, unlike the use of the operation unit 118, the use of the fingerprint reader unit to extend the time left before automatic logout makes it possible to prevent another user from extending the left time. However, compared to the method which involves reading fingerprint information, the method according to the above embodiments which extend the left time based on acquired face information offers the advantage of eliminating the need for the user to carefully place a finger on the fingerprint reader intentionally. As long as the user stays in a range in which the user's face can be photographed by a camera, the user can extend the left time. Although a variation of the first embodiment has been described here, the same method is also applicable to the second embodiment.

A configuration of data processing programs readable by the image processing apparatus according to the present invention will be described below with reference to a memory map in FIG. 13.

FIG. 13 is a diagram illustrating a memory map of a computer-readable storage medium which stores various data processing programs readable by the image processing apparatus according to the present invention.

Although not illustrated particularly, the storage medium may also store information, such as version information and author information, used to manage the programs stored in the storage medium as well as information, such as icons and the like which identify and represent programs, dependent on the OS or the like which read the programs.

Furthermore, data dependent on various programs is also managed in directories of the storage medium. Besides, the storage medium may store a program used to install the programs on a computer as well as a decompression program if programs to be installed have been compressed.

Functions of the present embodiments shown in the flowcharts may be performed by a host computer using programs installed externally. In that case, the present invention is also applicable when information including programs is supplied to an output apparatus from a storage medium such as a CD-ROM, flash memory, or FD or from an external storage medium via a network.

As described above, the objects of the present invention can also be accomplished by a storage medium containing software program code that implements the functions of the above embodiments: the storage medium is supplied to a system or apparatus, whose computer (or a CPU or MPU) then reads the program code out of the storage medium and executes it.

In that case, the program code itself read out of the storage medium will implement novel functions of the present invention, and the storage medium which stores the program code will constitute the present invention.

Thus, the program code may take any form including object code, programs executed by an interpreter, and script data supplied to an OS as long as it has program functions.

Examples of the storage medium used to supply the programs include, a flexible disk, hard disk, optical disk, magneto-optical (MO) disk, CD-ROM, CD-R, CD-RW, magnetic tape, non-volatile memory card, ROM, and DVD.

In that case, the program code itself read out of the storage medium will implement the functions of the above embodiments, and the storage medium which stores the program code will constitute the present invention.

Besides, the programs can also be supplied via an Internet homepage. In that case, the user is supposed to connect to the Internet homepage using a browser on a client computer and download the computer programs of the present invention onto a storage medium such as a hard disk. The programs may be downloaded as a compressed self-installing file. Also, the program code of the programs according to the present invention may be divided into multiple files, which can be downloaded from respective homepages. That is, the claims of the present invention also include WWW servers or ftp servers which allow multiple users to download program files capable of implementing the functions and processes of the present invention on a computer.

The present invention may also be distributed to users as a storage medium such as a CD-ROM containing the programs of the present invention in encrypted form. In that case, only the users who satisfy predetermined conditions are provided with key information for decryption through a download from an Internet homepage and allowed to decrypt and install the programs in executable form on a computer using the key information.

The functions of the above embodiments may be implemented not only by the program code read out and executed by the computer, but also in conjunction with an OS (Operating System) or the like running on the computer. In that case, the functions of the above embodiments are implemented by part or all of the actual processing executed by the OS or the like in accordance with instructions from the program code.

Furthermore, the program code can be read out of the storage medium and written into a memory contained in a function expansion board inserted in a computer or a function expansion unit connected to a computer. Subsequently, a CPU or the like contained in the function expansion board or unit can execute part or all of the actual processing based on instructions in the program code to realize the functions of the above embodiments.

The present invention is not limited to the above embodiments, and various modifications (including organic combinations thereof) may be made without departing from the spirit of the present invention. Such modifications are not excluded from the present invention.

Although the present invention has been described by way of various examples and embodiments, it will be apparent to those skilled in the art that the spirit and scope of the present invention is not limited by any specific description provided herein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-179462 filed on Jul. 9, 2008, which is hereby incorporated by reference herein in its entirety.

What is claimed is:

1. An information processing apparatus comprising:
   a display unit that displays an operation screen;
   an acquiring unit that acquires biological information of a user; and
   a display control unit that controls the display unit to change the operation screen to a predetermined state in a case where a predetermined time elapses without acquiring any biological information after biological information of a first user has been acquired the last time, that controls the display unit to change the operation screen to the predetermined state in a case where biological information of a second user different from the first user is acquired by said acquiring unit after biological information of the first user has been acquired the last time and before the predetermined time elapses, and that does not control the display unit to change the operation screen to the predetermined state in a case where biological information of the first user is acquired by said acquiring unit after biological information of the first user has been acquired the last time and before the predetermined time elapses.

2. The information processing apparatus according to claim 1, further comprising:
   a first storage unit that stores the biological information acquired by said acquisition unit; and
   a determination unit that determines whether or not the biological information stored in said first storage unit and biological information newly acquired by said acquisition unit match,
   wherein said display control unit changes the operation screen to the predetermined state in a case where it is determined by said determination unit that the biological information stored in said first storage unit and the newly acquired biological information do not match.

3. The information processing apparatus according to claim 1, further comprising:
   a second storage unit that stores settings of the operation screen by associating the settings with identification information for the first user in a case where the operation screen is changed to the predetermined state by said display control unit,
   wherein said display control unit displays the operation screen based on the settings of the operation screen stored in said second storage unit by being associated with the identification information for the first user in a case where biological information of the first user is acquired by said acquiring unit after the predetermined time has elapsed and the operation screen has been changed to the predetermined state.

4. The information processing apparatus according to claim 1, further comprising:

a detection unit that detects a presence of a user using a sensor, wherein said acquisition unit acquires the biological information of the user when the presence of the user is detected by said detection unit, but does not acquire the biological information of the user when the presence of the user is not detected by said detection unit.

5. The information processing apparatus according to claim 1, wherein:

the biological information is face information, fingerprint information, vein information, voiceprint information, hand geometry information, retina information, or iris information.

6. A control method for an information processing apparatus comprising:

displaying an operation screen on a display unit;

acquiring biological information of a user via an acquisition unit;

controlling the display unit to change the operation screen to a predetermined state in a case where a predetermined time elapses without acquiring any biological information after biological information of a first user has been acquired the last time; and controlling the display unit to change the operation screen to the predetermined state in a case where biological information of a second user different from the first user is acquired after biological information of the first user has been acquired the last time and before the predetermined time elapses, wherein the operation screen is not changed to the predetermined state in a case where biological information of the first user is acquired after biological information of the first user has been acquired the last time and before the predetermined time elapses.

7. The control method for an information processing apparatus according to claim 6, further comprising:

storing, in a first storage unit, the biological information acquired in said acquiring step; and determining whether or not the biological information stored in said first storage unit and biological information newly acquired by said acquisition unit match a user newly acquired are identical, wherein the operation screen is changed to the predetermined state in a case where it is determined in said determining step that the biological information stored in said first storage unit and the newly acquired biological information do not match.

8. The control method for an information processing apparatus according to claim 6, further comprising:

storing, in a second storage unit, settings of the operation screen by associating the settings with identification information for the first user in a case where the operation screen is changed to the predetermined state; and controlling the display unit to display the operation screen based on the settings of the operation screen stored in the second storage unit by being associated with the identification information for the first user in a case where biological information of the first user is acquired after the predetermined time has elapsed and the operation screen has been changed to the predetermined state.

9. The control method for an information processing apparatus according to claim 6, further comprising:

detecting a presence of a user using a sensor, wherein the biological information of the user is acquired when the presence of the user is detected by the sensor, but biological information of the user is not acquired when the presence of the user is not detected by the sensor.

10. The control method for an information processing apparatus according to claim 6, wherein:

the biological information is face information, fingerprint information, vein information, voiceprint information, hand geometry information, retina information, or iris information.

11. A non-transitory computer-readable storage medium storing a computer program configured to be executed at least by a computer of an information processing apparatus, the program comprising:

a display module configured to display an operation screen on a display unit;

an acquiring module configured to acquire biological information of a user; and a display control module configured to:

control the display unit to change the operation screen to a predetermined state in a case where a predetermined time elapses without acquiring any biological information after biological information of a first user has been acquired the last time, control the display unit to change the operation screen to the predetermined state in a case where biological information of a second user different from the first user is acquired according to acquiring module after biological information of the first user has been acquired the last time and before the predetermined time elapses, and not to control the display unit to change the operation screen to the predetermined state in a case where biological information of the first user is acquired according to said acquiring module after biological information of the first user has been acquired the last time and before the predetermined time elapses.

12. The information processing apparatus according to claim 3, wherein said display control unit displays the operation screen based on the settings of the operation screen stored in said second storage unit by being associated with the identification information for the first user in a case where biological information of the first user is acquired by said acquiring unit after biological information of the second user has been acquired.

13. The information processing apparatus according to claim 1, wherein the predetermined state is a state after logout of the first user.

14. The control method for an information processing apparatus according to claim 8, further comprising:

controlling the display unit to display the operation screen based on the settings of the operation screen stored in the second storage unit by being associated with the identification information for the first user in a case where biological information of the first user is acquired after biological information of the second user has been acquired.

15. The control method for an information processing apparatus according to claim 6, wherein the predetermined state is a state after logout of the first user.

16. An information processing apparatus comprising:

a display unit that displays an operation screen;

an acquiring unit that acquires biological information of a user;

a display control unit that controls the display unit to change the operation screen to a login state to allow another user to log into the information processing apparatus in a case where a predetermined time elapses without acquiring any biological information after biological information of a first user that has been logged into the information processing apparatus has been acquired the last time, that controls the display unit to change the operation screen to the login state in a case where biological information of a second user different from the first user is acquired by said acquiring unit after the biological information of the first user has been acquired the last time and before the predetermined time elapses, and that does not control the display unit to change the login screen to the predetermined state in a case where the biological information of the first user is acquired by said acquiring unit after biological information of the first user has been acquired the last time and before the predetermined time elapses; and a storage unit that stores a setting of the operation screen in a case where the operation screen is changed to the login state, the stored setting of the operation screen being associated with identification information for identifying the first user, wherein, when a user who logs into the information processing apparatus after the operation screen is changed to the login state is the first user, the display control unit controls the display unit to display the operation screen based on the setting of the operation screen which is stored in the storage unit and is associated with the identification information for identifying the first user.

\* \* \* \* \*